(12) United States Patent
Furuhaug

(10) Patent No.: US 8,942,059 B2
(45) Date of Patent: Jan. 27, 2015

(54) CONTAINER SYSTEM FOR SEISMIC CABLE AND STATIONS

(75) Inventor: Roar Furuhaug, Trondheim (NO)

(73) Assignee: Optoplan AS, Tiller (NO)

( * ) Notice: Subject to any disclaimer, the term of this patent is extended or adjusted under 35 U.S.C. 154(b) by 1664 days.

(21) Appl. No.: 12/234,431

(22) Filed: Sep. 19, 2008

(65) Prior Publication Data

US 2010/0074048 A1    Mar. 25, 2010

(51) Int. Cl.
*G01V 1/38* (2006.01)
*F16L 1/12* (2006.01)
*F16L 1/20* (2006.01)
*B63B 25/28* (2006.01)
*B63B 38/00* (2006.01)

(52) U.S. Cl.
CPC ............. *G01V 1/3843* (2013.01); *F16L 1/207* (2013.01); *B63B 25/28* (2013.01); *B63B 38/00* (2013.01)
USPC ............................................ 367/15; 405/158

(58) Field of Classification Search
USPC ............. 367/15, 20; 405/154.1, 158; 114/256
See application file for complete search history.

(56) References Cited

U.S. PATENT DOCUMENTS

| | | | |
|---|---|---|---|
| 3,093,333 A | 6/1963 | Bishop | |
| 3,608,710 A * | 9/1971 | Pugh | 405/154.1 |
| 4,953,146 A * | 8/1990 | McMurry | 367/191 |
| 5,193,756 A * | 3/1993 | Chesler | 242/593 |
| 5,624,207 A | 4/1997 | Berges | |
| 5,902,072 A * | 5/1999 | Berges | 405/173 |
| 6,044,786 A * | 4/2000 | Dudley et al. | 114/242 |
| 6,350,085 B1 | 2/2002 | Bath et al. | |
| 6,588,980 B2 | 7/2003 | Worman et al. | |
| 6,796,261 B2 | 9/2004 | Colyer | |
| 6,957,929 B1 | 10/2005 | Rachel et al. | |
| 7,483,335 B2 * | 1/2009 | Oldervoll et al. | 367/15 |
| 7,649,803 B2 * | 1/2010 | Ray et al. | 367/15 |
| 7,883,292 B2 * | 2/2011 | Thompson et al. | 405/166 |
| 8,021,080 B2 * | 9/2011 | Frivik et al. | 405/166 |

(Continued)

FOREIGN PATENT DOCUMENTS

| | | |
|---|---|---|
| GB | 1 540 650 | 2/1979 |
| GB | 2 437 406 | 10/2007 |

(Continued)

OTHER PUBLICATIONS

Extended European Search Report and European Search Opinion for European Application No. EP 09 17 0636 dated Dec. 5, 2013.

*Primary Examiner* — Ian J Lobo
(74) *Attorney, Agent, or Firm* — Pearl Cohen Zedek Latzer Baratz LLP

(57) ABSTRACT

Container systems used in storage, deployment or retrieval of a seismic cable array comprise a container, at least two coiling elements attached to a bottom side of the container, and storage means for allocating or accommodating, in an ordered arrangement, a number of seismic stations and/or a number of couplers/splices and/or other discontinuities which are being interconnected by sections of the seismic cable. Said storage means is arranged between said coiling elements and are attached to the bottom side of the container. The seismic cable is spooled or wound around said coiling elements. Corresponding methods of storing a seismic cable and deploying/retrieving the seismic cable are based on the use of at least two coiling elements and storage means for allocating or accommodating a number of seismic stations and/or a number of couplers/splices and/or a number of other discontinuities and arranged between said coiling elements.

16 Claims, 4 Drawing Sheets

(56) References Cited

U.S. PATENT DOCUMENTS

| | | |
|---|---|---|
| 2002/0172562 A1 | 11/2002 | Worman et al. |
| 2003/0167997 A1 | 9/2003 | Colyer |
| 2004/0065443 A1 | 4/2004 | Berg et al. |
| 2007/0248417 A1 | 10/2007 | Berg |
| 2008/0192569 A1 * | 8/2008 | Ray et al. .................. 367/15 |

FOREIGN PATENT DOCUMENTS

| | | |
|---|---|---|
| WO | 2004068012 A2 | 8/2004 |
| WO | WO 2005/010316 | 2/2005 |

* cited by examiner

CONTAINER SYSTEM FOR SEISMIC CABLE AND STATIONS

BACKGROUND OF THE INVENTION

1. Field of the Invention

The present invention relates in general to deployable cables for use in seismic surveying and comprising discontinuities as for example transducers/sensors for sensing of received acoustic signals at subsea locations resulting from at least one generated seismic signal. More particularly, the invention relates to a system and a method for storing, transporting and/or handling seismic cable(s) incorporating a number of seismic stations or other discontinuities for use in seismic surveying at offshore locations. Operations, related to deployment and/or retrieval of such cables, are generally aimed at placing a seismic cable on the sea bottom, normally in a trench, under different weather conditions and with a failure rate as low as possible.

2. Description of the Related Art

Storing, transportation, deployment and/or retrieval of subsea cables is/are now a common procedure performed by a number of operators.

Typically, the subsea cables are very long and consist of a number of discontinuities, e.g., regenerators. When repeaters are included along the cable, such repeaters usually require special handling, such as e.g., hand carrying, in the deployment apparatus onboard a vessel, in order to ensure that no damage is made to the repeaters.

Published US Patent Application No. 2007/0248417 A1, to Berg, teaches a method and system for use in storage, deployment or retrieval of a seismic cable comprising a number of seismic stations.

Published US Patent Application No. 2004/0065443 A1, to Berg et al., describes an apparatus and method for transporting, deploying and retrieving an array of a plurality of nodes interconnected by sections of a cable. An apparatus and a method for transporting, deploying and retrieving a preassembled fiber optic in-well seismic array having a plurality of fiber optic sensors, clamp mechanisms and sections of cables between sensors is also described.

As described in published US Patent Application No. 2004/0065443 A1, some difficulties are encountered when sections of the seismic cable and its nodes are wound on to or unwound from a cable drum or other carrying device, due to the size, shape and construction of the nodes. Typically, the nodes constitute bulges on the cable, and the nodes are typically less flexible than the other sections of the seismic cable.

One drawback of the present solutions for seismic cable storage, deployment and retrieval is that the volume of a seismic cable storage or transportation system or device is not utilized very efficiently.

Another drawback of the present solutions for seismic cable storage, deployment and retrieval is that the transportation of the drum(s) with spooled or coiled cable requires special solutions because of the size.

Yet another drawback of the present solutions for seismic cable storage, deployment and retrieval is that a heavy and long cable has a tendency to move and unwind from the drum. In addition, if there are a number of seismic stations on a seismic cable, the cable may easily become trapped between other layers of cable or behind seismic stations and an entangled cable may result in kinks or even eventual breakage of the cable when unspooled.

Storing, transportation, deployment and retrieval of seismic cables which include a large number of sensor points or sensor stations with interconnecting cable is presently a challenge for most seismic cable operators or companies.

There exists a need for an improved storage device or system for use in cable storage, deployment and retrieval which may facilitate more efficient and predictable storage, deployment and retrieval of seismic cables, and a method which enables improved functionality while reducing the above mentioned drawbacks of the present solutions.

SUMMARY OF THE INVENTION

One aspect of the present invention is to provide a container system or device for use in storage, transportation, deployment and/or retrieval of a seismic cable array. The container system comprises a container, at least two coiling or spooling elements or drums for spooling or coiling of a seismic cable around them, wherein each of said coiling or spooling elements can be arranged in each opposite end area or each half area (which areas can be defined by the symmetry line which is parallel with the short side walls, also called "short-side symmetry line") of the container and having one end attached to a bottom side or bottom-side wall of the container, and storage means for allocating or accommodating, e.g., in an ordered arrangement, at least one of: a number of seismic stations, a number of couplers/splices and/or a number of other discontinuities which are being interconnected by sections of the seismic cable; said storage means being arranged between said at least two coiling elements and attached to the bottom side of the container. The form of said coiling or spooling elements can be substantially cylindrical. Alternatively, an asymmetrical arrangement of said at least two coiling or spooling elements within the container should also be possible, wherein the gravity center of the full loaded container should be within allowed ranges and/or wherein there should be easy to get or spool the cable in and out of the container.

On at least one side of the succession or group formed by said at least two coiling elements and said storage means in-between, i.e., on at least one side of the symmetry line which is parallel with the long side walls (called "long-side symmetry line"), there is according to one embodiment free space or room between said storage means and a side wall of the container. When necessary or desired, said space or room will allow the seismic cable, spooled or wound between said at least two coiling elements, to run therethrough and thus not only through said storage means for allocation or accommodation.

In a preferred, but not limiting, embodiment of the container system according to an aspect of the invention, the seismic stations of the seismic cable may have a substantially circular cross section in the direction of the seismic cable.

In another embodiment of the container system according to another aspect of the invention, the seismic stations of the seismic cable may have a substantially non-circular cross section in the direction of the seismic cable.

In one embodiment of the container system according to one aspect of the invention, the seismic stations of the seismic cable may have a substantially non-circular cross section in a direction perpendicular to the direction of the seismic cable.

In another embodiment of the container system according to another aspect of the invention, the seismic stations may have a substantially circular cross section perpendicular to the seismic cable direction.

In another embodiment of the container system according to the present invention, the seismic cable is spooled or wound around said coiling elements and running in between through said storage means or said space with a twist of approximately 360 degrees for one closed round or loop or turn.

In yet another embodiment of the container system according to the present invention, said coiling elements or drums are hollow.

In yet another embodiment of the container system according to the present invention, said container is a standard 20' or 40' ISO container having an open top side or a detachable top-side wall. However, the invention should not be limited only to ISO containers. Other container types and/or standards should also be possible.

In a further embodiment of the container system according to the present invention, said container has at least one wall, for example at least one of its side walls and/or its top-side wall (if there is any), being detachable.

One aspect of the present invention is to provide a container system or device for use in storage, transportation, deployment and/or retrieval of a seismic cable comprising seismic stations and/or couplers/splices and/or other discontinuities arranged along the cable at different distances with respect to each other, thus making the whole system suitable for different array-cable configurations.

Another aspect of the present invention is to provide a container system or device for use in storage, transportation, deployment and/or retrieval of a seismic cable comprising seismic stations and/or couplers/splices and/or other discontinuities wherein said seismic stations and/or couplers/splices and/or other discontinuities are arranged or accommodated or stored or placed apart from a spooling or coiling element (e.g., drum or cylinder), thus avoiding any unnecessary loads or strains on the cable and/or the stations or discontinuities as well as avoiding the cable to be trapped between other layers of cable or behind the seismic stations and/or couplers/splices and/or other discontinuities.

Yet another aspect of the present invention is to provide a container system or device for use in storage, transportation, deployment and/or retrieval of a seismic cable wherein the system has high payload efficiency, i.e., the volume of the system is utilized more efficiently compared to the prior art.

A further aspect of the present invention is to provide a container system and method for use in storage, transportation, deployment and/or retrieval of a seismic cable wherein the cable handling is simplified and/or limited, thus allowing easy loading of the cable at a factory and with high packing speed as well as easy unloading of the cable directly from the container system.

In a further aspect of the invention, there is described a method for storing, transporting and/or handling seismic cable(s) incorporating a number of seismic stations or discontinuities for use in seismic surveying at offshore locations.

In yet another aspect of the invention, there is described a method for loading/unloading or deploying/retrieving a seismic cable array at a factory or at a subsea location.

In a further aspect of the invention, there is described a method of storing a seismic cable comprising first providing a seismic cable array which includes a number of seismic stations or discontinuities, and then arranging said array in a container system or device according to the invention.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
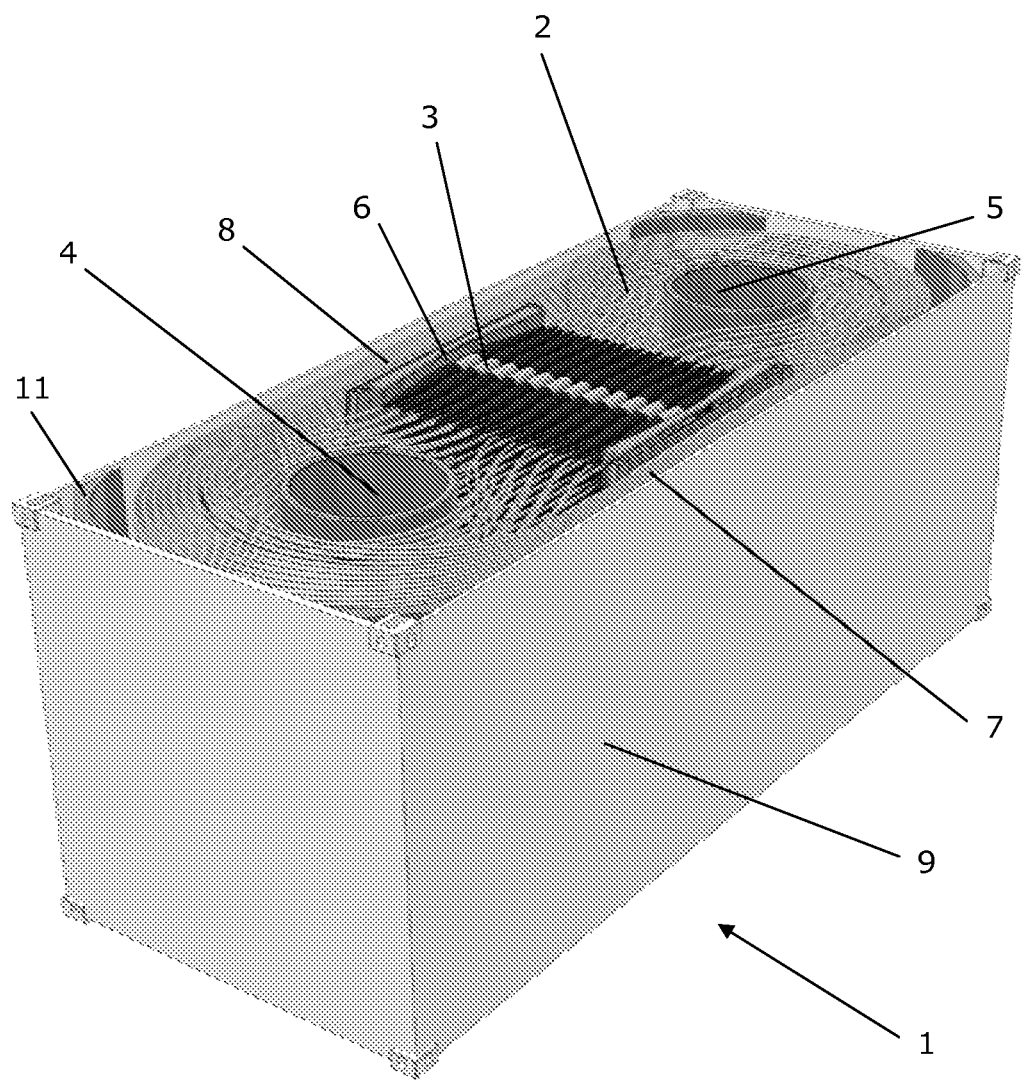
FIG. 1 illustrates an example embodiment of a container system with a cable arrangement according to the present invention.

FIG. 1 illustrates a container system or device 1 according to the present invention and adapted to be used with a seismic cable 2 comprising seismic stations and/or couplers/splices and/or other discontinuities 3. The system 1 for use in storage, transportation, deployment and/or retrieval of the seismic cable 2 comprises a container 9, two coiling elements 4, 5 for spooling of the seismic cable around them, and storage means 6 for allocating or accommodating said seismic stations and/or couplers/splices and/or other discontinuities 3. Each of said coiling elements 4, 5 is arranged in each opposite end area or each half area (which areas are defined by the symmetry line which is parallel with the short side walls, also called "short-side symmetry line") of the container 9 (i.e., nearby each of both short side walls) and has one of its ends attached to a bottom side or wall of the container 9. The storage means 6 is arranged between said coiling elements 4, 5 and attached to the bottom side of the container 9. Said coiling elements 4, 5 can have a substantially cylindrical form and define a minimum bending or bend radius for the cable 2 when the cable 2 is being spooled or coiled around them. The distance between said elements 4, 5 can be adapted or adjusted to the cable 2 length between each station or other discontinuity 3 so that the cable coil ratio between two stations or other discontinuities 3 is divisible by a whole number of turns plus one half so that the seismic stations 3 and the cable 2 are being evenly or uniformly distributed. The two coiling elements 4 and 5 can have, but are not limited to, a mirror symmetrical design. Said elements 4, 5 according to other possible embodiments can have other suitable forms allowing approximately at least half turn of the cable 2 to be wound or spooled around them, as for example they can be semicircle-shaped, drop-shaped, C-formed or D-formed. Therefore, said elements 4, 5 of the invention should not be limited to only cylindrical form. When said elements 4, 5 are C-formed, it is preferred that each of said elements 4, 5 has its opening orientated towards the stack or pile of seismic stations or other discontinuities, i.e., towards the storage means 6, in order to make it possible to place or arrange a ladder or steps therein, so that the admission or access (if necessary) to said stack or pile of seismic stations or other discontinuities for (manual) inspection and/or handling (e.g., under loading/unloading) will be quite easy.

Figure 2:
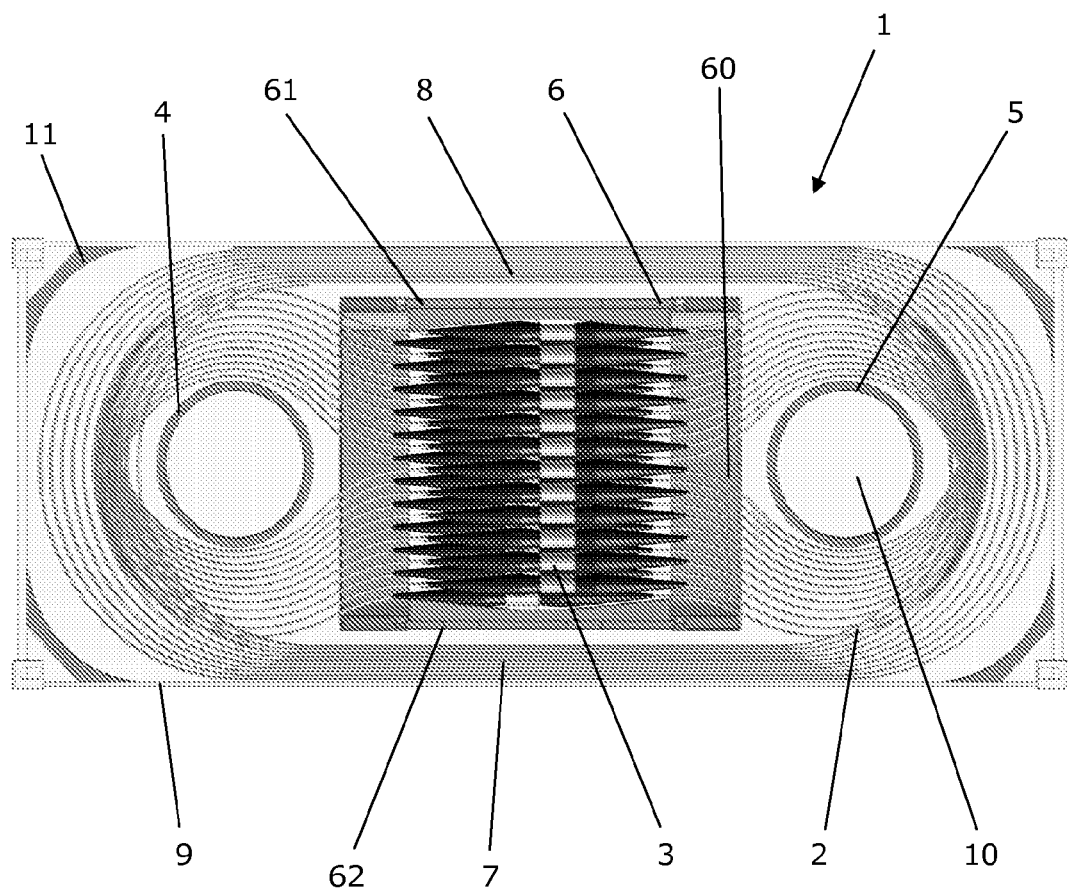
FIG. 2 shows a top side view of the example embodiment illustrated in FIG. 1.

FIG. 2 shows a top side view of the example embodiment illustrated in FIG. 1. On each side of the succession or group formed by said two coiling or spooling elements 4, 5 and said storage means 6 in-between, i.e., on each side of the symmetry line which is parallel with the long side walls (called "long-side symmetry line"), there is space or room 7, 8 between said storage means 6 and a side wall of the container 9. When necessary or desired, said space or room 7, 8 allows the seismic cable 2, spooled or wound between said two coiling elements 4, 5, to run therethrough and thus not only through said storage means 6 for allocating or accommodating.

In a preferred, but not limiting, embodiment of the invention, the seismic stations and/or couplers/splices and/or other discontinuities 3 can have a substantially circular cross section in the direction of the seismic cable 2. In one possible embodiment of the invention the seismic stations and/or couplers/splices and/or other discontinuities 3 can have a substantially non-circular cross section, for example a near rectangular cross section, in a direction perpendicular to the seismic cable direction. In another possible embodiment of the invention, the seismic stations and/or couplers/splices and/or other discontinuities 3 can have a substantially non-circular cross section in the direction of the seismic cable 2. In yet another possible embodiment of the invention, the seismic stations and/or couplers/splices and/or other discontinuities 3 can have a substantially circular cross section in a direction perpendicular to the seismic cable direction.

The seismic cable 2 can be spooled or wound around said coiling elements 4, 5 and running in between either through said storage means 6 or said space 7, 8 with a twist of approximately 360 degrees for one closed round or loop or turn.

In a preferred, but not limiting, embodiment the coiling elements 4, 5 can be hollow. On the top side, they can also be covered by suitable covering means (not shown) attached to their top side ends. The coiling elements 4, 5 and/or their covering means can preferably, but not limiting, be made of metal. In one possible embodiment the coiling elements 4, 5 can be welded to the bottom wall 10 of the container 9. However, any other suitable attachment of the coiling elements 4, 5 to the bottom wall 10 of the container 9 should also be included (e.g., with bolts, screws or the like). In case the top ends of the coiling elements 4, 5 are covered by covering means preferably, but not limiting, made of metal, the attachment can be made by welding. However, any other suitable attachment of the covering means to the top ends of the coiling elements 4, 5 should also be included. When said coiling element 4, 5 is cylindrical, the respective covering means can be circular.

In a preferred, but not limiting, embodiment of the invention the container 9 is a standard 20' ISO container having an open top side or a detachable top-side wall (not shown). The standard 20' ISO container has approximately the following dimensions: length about 6.06 m, height about 2.60 m and width about 2.44 m. These dimensions are not limiting and the container can have any other suitable dimensions. The container is preferably, but not limiting, made of metal. The invention should not be limited only to ISO containers. Other container types and/or standards should also be possible.

In a possible embodiment of the invention, the container 9 can have at least one wall which is detachable. Said at least one detachable wall can be any one of the container's side walls and/or the container's top-side wall if there is any.

In one possible embodiment of the invention the storage means 6 can comprise a support or base member 60 having preferably but not limiting a rectangular shape and attached to the bottom-side wall 10 of the container 9 and two division or separator walls or plates 61, 62 substantially parallel with each other and substantially perpendicular to the support or base member 60 and the bottom side 10 of the container 9. Said two division or separator walls or plates 61, 62 have preferably but not limiting a rectangular shape, and each of them is being attached to each end of the bottom-side wall 10 which is orientated or facing towards the respective container 9 side wall. In this case, the storage means 6 can be made of only one piece that is being folded or bended or of three different pieces that are being welded together. Other suitable attaching processes than welding should also be included.

In a possible embodiment of the present invention the storage means 6, and particularly the support or base member 60 thereof, can be provided with longitudinal and parallel bars or rods (not shown) attached thereto and adapted for guiding and holding the right direction of the seismic stations and/or other discontinuities 3, and particularly the first row of the seismic stations and/or other discontinuities 3, when the cable is being loaded at the factory. In an alternative embodiment, the support or base member 60 can be provided with longitudinal and parallel grooves for guiding and holding the right direction of the seismic stations and/or other discontinuities 3, and particularly the first row of the seismic stations and/or other discontinuities 3, under loading. In the case when a support or base member 60 is absent in the storage means 6, said longitudinal and parallel bars or rods for guiding (not shown) can be attached directly onto the bottom wall 10 of the container 9. The form of the bars/rods or grooves/canals can be rounded. However, other forms should also be possible.

In another possible embodiment of the invention the storage means 6 can comprise two division or separator walls or plates 61, 62 substantially parallel with each other and substantially perpendicular to the bottom side or wall 10 of the container 9, which walls or plates 61, 62 are attached to the bottom side or wall 10 of the container 9 in such a way that they 61, 62 are substantially parallel with the succession or group or row formed by the two coiling elements 4, 5 and said storage means 6 in-between, i.e., substantially parallel with the long-side symmetry line, thus providing the free space or room 7, 8.

Said walls or plates 61, 62 should be solid enough in order to bear or sustain different strains or forces, e.g., accelerating forces under transportation. The storage means 6 can in addition be supplied with suitable fastening means in order to fasten or tie or strap the bundle or pack or group of stations or other discontinuities 3, for example approximately in the middle of the length of said storage means 6.

In a preferred, but not limiting, embodiment the storage means 6 can be made of metal and welded to the bottom side or wall 10 of the container 9. However, the invention should not be limited to this attachment method. The attachment of the storage means 6 to the bottom side or wall 10 of the container 9 can for example be done by using bolts, screws or the like.

The design of the container system 1 yields a systematic packing arrangement for the cable array 2, while at the same time minimizes the risk that one seismic station or discontinuity 3 becomes trapped between several other seismic stations or discontinuities 3, thereby causing problems when unloading the cable array 2 from the container system 1.

In each corner of the container 9 there can be arranged a curved segment 11 which is attached to the corner side walls of the container and prevents the cable 2 from being stuck or squeezed in said corner thus getting too little bending radius which can lead to damages to the cable 2. The curving or bending of said segment 11 can be, but is not limited to, approximately 90 degrees.

Figure 3:
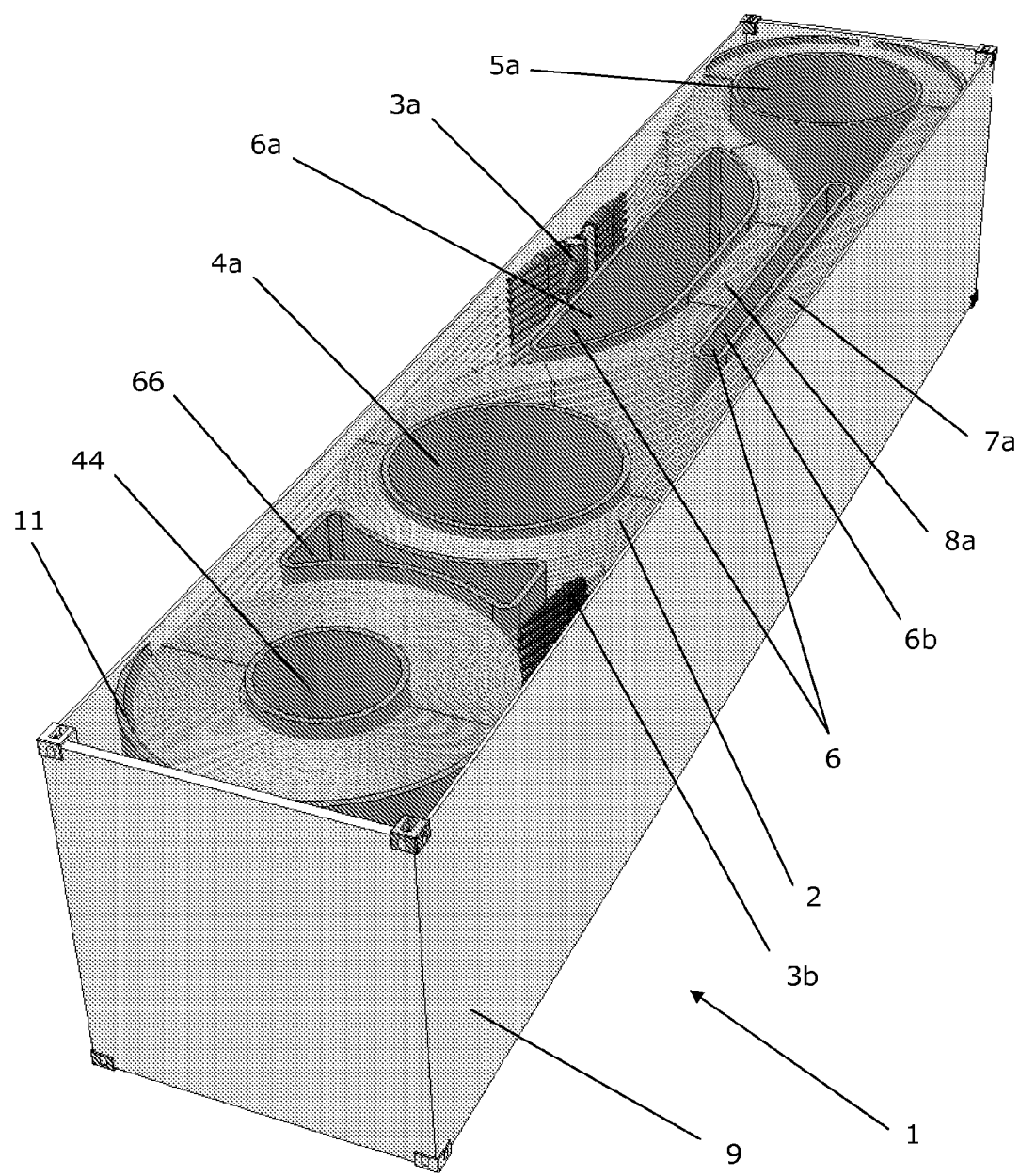
FIG. 3 illustrates another example embodiment of a container system with a cable arrangement according to the present invention.
Figure 4:
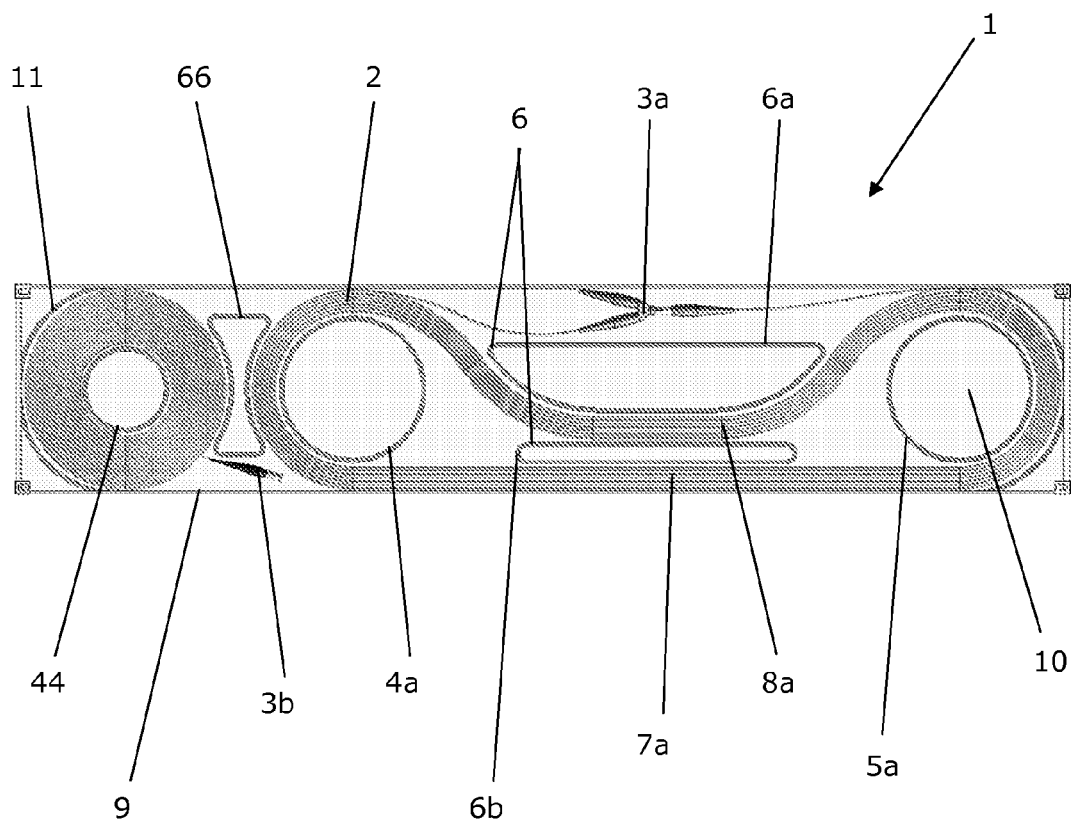
FIG. 4 shows a top side view of the example embodiment illustrated in FIG. 3.

An additional embodiment of the container system or device 1 according to the present invention and adapted to be used with a seismic cable 2 comprising seismic stations and/or couplers/splices and/or other discontinuities 3a, 3b, is shown in FIGS. 3 and 4. The seismic cable 2 is a lead-in cable comprising branch cables and Y-couplers 3a. This system 1 for use in storage, transportation, deployment and/or retrieval of the seismic cable 2 comprises a container 9, three coiling elements 4a, 44, 5a for spooling of the seismic cable(s) 2 around them, and storage means 6, 6a, 6b for allocating or accommodating said seismic stations and/or couplers/splices and/or other discontinuities 3a and at the same time allowing the cable 2 to run through or beside it 6, 6a, 6b in order to be spooled or wound around the two coiling elements 4a, 5a. Said coiling elements 4a, 44, 5a have one of its ends attached to a bottom side or wall 10 of the container 9. Two of said coiling elements 4a, 44 can be arranged substantially along the symmetry line which is parallel with the long side walls (called "long-side symmetry line") and in one of the opposite end areas or half areas (which areas are defined by the symmetry line which is parallel with the short side walls, also called "short-side symmetry line") of the container 9 (i.e., nearby one of the short side walls) and the other coiling element 5a can be arranged in the other one of the opposite end areas or half areas of the container 9 (i.e., nearby the other one of the short side walls). The storage means 6, 6a, 6b is arranged between two coiling elements 4a and 5a and substantially along the long-side symmetry line and is attached to the bottom side 10 of the container 9. These two coiling elements 4a and 5a can have, but are not limited to, a mirror symmetrical design since the same cable is being spooled or wound around them. In addition, the third coiling element 44 can have a slightly different design, because a different type of cable is being coiled around it. Usually, the branch cable can have a diameter different from the diameter of the lead-in cable. Between the other two coiling elements 4a and 44, means 66 for separating the cable wound or spooled around the third coiling element 44 from the cable wound or spooled around the second coiling element 4a can be arranged. Said means 66 for separating the cable is attached to the bottom side 10 of the container 9 and can serve to guide the cable 2 around each coiling element 4a, 44 and to prevent the cable 2 from being stuck or squeezed. Furthermore, said means 66 for separating the cable can be shaped as ")(" (e.g., comprising at least two semicircular or arc-formed sections facing each other). Beside said means 66 for separating the cable there can be enough room for placing the end couplers 3b. The coiling elements 4a, 44, 5a can have a substantially cylindrical form and define a minimum bending or bend radius for the cable 2 when the cable 2 is being spooled or coiled around them. Said coiling elements 4a, 5a according to other possible embodiments can have other suitable forms allowing approximately at least half turn of the cable 2 to be wound or spooled around them, as for example they can be semicircle-shaped, drop-shaped, C-formed or D-formed. Therefore, said coiling elements 4a, 44, 5a of the invention should not be limited to only cylindrical form. When said elements 4a, 5a are C-formed, it is preferred that each of said elements 4a, 5a has its opening orientated towards the storage means 6, 6a, 6b, in order to make it possible to place or arrange a ladder or steps therein, so that the admission or access (if necessary) to said stack or pile of seismic stations or other discontinuities 3a for (manual) inspection and/or handling (e.g., under loading/unloading) will be easy.

In the case with three coiling elements 4a, 44, 5a the storage means 6, 6a, 6b is arranged in such a way that the Y-couplers 3a are allocating or accommodated with the help of an arrangement 6a thereof which can be adapted to the form of the Y-couplers 3a and which can separate the Y-couplers 3a from the respective cable 2 lengths without seismic stations and/or couplers/splices and/or other discontinuities 3, 3a, 3b that are running through at least one free space or room 7a, 8a and are to be wound or spooled around the two coiling elements 4a, 5a. The cable running from the first 5a to the second 4a coiling element can be separated from the cable running from the second 4a to the first 5a coiling element by means of a separator element or wall 6b.

In the case with three coiling elements 4a, 44, 5a the container 9 can be, but is not limited to, a standard 40' ISO container having an open top-side or a detachable top-side wall (not shown).

The invention relates also to a method for loading and/or unloading of a seismic cable 2 comprising seismic stations and/or couplers/splices and/or other discontinuities 3 on top of and/or from a container system 1 adapted for use in storage, transportation, deployment and/or retrieval of at least one seismic cable 2, wherein the method comprises the following steps: loading/unloading the seismic cable 2 around a first coiling element 4 and through either storage means 6 when the respective cable 2 length has a seismic station and/or coupler/splice and/or other discontinuity 3 or at least one free space or room 7, 8 when the respective cable 2 length does not have a seismic station and/or coupler/splice and/or other discontinuity 3, and around a second coiling element 5 and back through either the storage means 6 when the respective cable 2 length has a seismic station and/or coupler/splice and/or other discontinuity 3 or the free space or room 7, 8 when the respective cable 2 length does not have a seismic station and/or coupler/splice and/or other discontinuity 3, and around the first coiling element 4. These steps are repeated until the cable is completely loaded or unloaded.

In the case when the cable 2 is a lead-in cable comprising branch cables and Y-couplers 3a, then the branch cables from the other end of the Y-couplers 3a are being wound or spooled around a third coiling element 44. The spooling or winding steps are repeated until the cable 2 is completely loaded or unloaded.

Under loading the method can comprise the step of spooling or winding the seismic cable around said coiling elements 4, 5 (respectively 4a, 44, 5a) and running in between through said storage means 6 or said space 7, 8 (respectively 7a, 8a) with a twist of approximately 360 degrees for one closed round or loop or turn.

Alternatively, an asymmetrical arrangement, placement or design of said at least two coiling or spooling elements 4, 5 (respectively 4a, 44, 5a) and/or said storage means 6 within the container 9 should also be possible, wherein the gravity center of the full loaded container should be within allowed ranges and/or wherein there should be easy to get or spool the cable 2 in and out of the container 9 and/or wherein said coiling or spooling elements and/or said storage means 6 should be placed or arranged to have the most appropriate or suitable position in relation to the cable 2 and/or its discontinuities 3 (respectively 3a, 3b—e.g., the case with Y-couplers) and/or the distances between said discontinuities 3 (respectively 3a, 3b).

The present invention relates further to a method of storing a seismic cable, comprising the steps of: providing a seismic cable array 2 which comprises a number of seismic stations and/or couplers/splices and/or other discontinuities 3; and arranging said array in a container system 1, wherein the system comprises at least two coiling elements 4, 5 being adapted for spooling or coiling of the seismic cable array 2 around them and storage means 6 being adapted for allocating or accommodating, in an ordered arrangement, at least one of: a number of seismic stations, a number of couplers/splices and a number of other discontinuities 3 which are being interconnected by sections of the seismic cable 2; wherein said storage means 6 is being arranged between said at least two coiling elements 4, 5 and attached to the bottom side of the container.

The container system according to the invention provides major benefits during deployment and/or retrieval of the seismic cable. The present invention makes it possible to provide a long cable length and to reduce as much as possible the number of required splices/couplers. The seismic cable 2 having seismic stations or other discontinuities 3 may be divided in sections, each section transported in a separate container system 1 according to the invention. In this way, a ship or vessel does not have to be loaded with all of the seismic cable at a factory or harbor location. The seismic cable can be preloaded into a number of container systems according to the invention, whereby a supply vessel may transport as many systems as required at one time to an installation vessel at an offshore location. The installation vessel does not have to carry all of the seismic cable from the onset of the installation operation. If the installation vessel cannot take all the cable arrays required for an installation, a more convenient transport vessel can bring new units (one or more container systems 1) preloaded with seismic cable 2 and seismic stations or other discontinuities 3 to an offshore location during an installation period.

Similarly, if a failure is detected subsea during installation of the seismic cable 2, the installation can be interrupted and the seismic cable (array) 2 may have to be rewound back onto the vessel. The sections of the seismic cable 2 are then typically placed back into the container systems 1.

Further, the use of a container system 1 according to the invention means that the seismic cable 2 can be reliably deployed, without risk of tangling the cable 2 and/or the seismic stations and/or other discontinuities 3.

In a possible embodiment of the present disclosure, the storage means 6, and particularly the support or base member 60 thereof, can be provided with longitudinal and parallel bars or rods (not shown) attached thereto and adapted for guiding and holding the right direction of the seismic stations and/or other discontinuities 3, and particularly the first row of the seismic stations and/or other discontinuities 3, when the cable is being loaded at the factory. In an alternative embodiment, the support or base member 60 can be provided with longitudinal and parallel grooves for guiding and holding the right direction of the seismic stations and/or other discontinuities 3, and particularly the first row of the seismic stations and/or other discontinuities 3, under loading. In the case when a support or base member 60 is absent in the storage means 6, said longitudinal and parallel bars or rods for guiding (not shown) can be attached directly onto the bottom wall 10 of the container 9. The form of the bars/rods or grooves/canals can be rounded. However, other forms should also be possible.

The container system 1 according to the invention can be designed to allocate and contain the required volume and weight of a reasonable length and weight of a cable array 2.

While the foregoing is directed to embodiments of the present invention, other and further embodiments of the invention may be devised without departing from the basic scope thereof, and the scope thereof is determined by the claims that follow. In the context of the claims, the terms "comprising" or "comprises" do not exclude other possible elements or steps. Also, the mentioning of references such as "a" or "an" etc. should not be construed as excluding a plurality. Furthermore, individual features mentioned in different claims, may possibly be advantageously combined, and the mentioning of these features in different claims does not exclude that a combination of features is not possible and advantageous.

The invention claimed is:

1. A container system for use in storage, transportation, deployment and/or retrieval of a seismic cable comprising seismic stations, wherein the system comprises:
a container, wherein said container is a standard 20' or 40' ISO container having an open top side or a detachable topside wall, at least two coiling elements for spooling of the seismic cable around them, each of said coiling elements having one end attached to a bottom side of the container, and storage device for allocating or accommodating, in an ordered arrangement, at least one of: a number of seismic stations, a number of couplers/splices and a number of other discontinuities which are being interconnected by sections of the seismic cable; said storage device being arranged between said at least two coiling elements and attached to the bottom side of the container.

2. The container system according to claim 1, wherein on at least one side of the succession or group formed by said at least two coiling elements and said storage device in-between, there is space or room between said storage device and a side wall of the container, and wherein, when necessary or desired, said space or room allows the seismic cable, spooled or wound between said at least two coiling elements, to run there through and thus not only through said device for allocating or accommodating.

3. The container system according to claim 1, wherein the seismic stations have a substantially circular cross section in the direction of the seismic cable.

4. The container system according to claim 1, wherein the seismic stations have a substantially non-circular cross section in the direction of the seismic cable.

5. The container system according to claim 1, wherein the seismic stations have a substantially non-circular cross section in a direction perpendicular to the seismic cable direction.

6. The container system according to claim 1, wherein the seismic stations have a substantially circular cross section in a direction perpendicular to the seismic cable direction.

7. The container system according to claim 2, wherein the seismic cable is spooled or wound around said coiling elements and running in between through said storage device or said space with a twist of approximately 360 degrees for one closed round or loop or turn.

8. The container system according to claim 1, wherein said coiling elements are hollow.

9. The container system according to claim 1, wherein said container has at least one wall, e.g., its side walls and/or its top-side wall, being detachable.

10. The container system according to claim 1, wherein the cable is a lead-in cable comprising branch cables and Y-couplers, and wherein the branch cables from the other end of the Y-couplers are wound or spooled around a third coiling element, said third coiling element having one end attached to a bottom side of the container.

11. The container system according to claim 2, wherein the system is arranged for the seismic cable to be spooled or wound around the coiling elements and through said storage device or said space in a non-figure-8 pattern.

12. A method for loading and/or unloading of a seismic cable, comprising seismic stations and/or couplers/splices and/or other discontinuities, on top of and/or from top of a container system adapted for use in storage, transportation, deployment and/or retrieval of at least one seismic cable, the container system comprising a container being a standard 20' or 40' ISO container having an open top side or a detachable topside wall, the container system comprising at least two coiling elements for spooling seismic cable around them in a non-figure-8 pattern, each of said coiling elements having one end attached to a bottom side of the container, and storage device for allocating or accommodating, in an ordered arrangement, seismic stations and/or couplers/splices and/or other discontinuities of the seismic cable said storage device being arranged between said at least two coiling elements and attached to the bottom side of the container, wherein the method comprises the following steps:

loading/unloading the seismic cable around a first coiling element and through either storage device means when the respective cable length has a seismic station and/or coupler/splice and/or other discontinuity or at least one free space or room when the respective cable length does not have a seismic station and/or coupler/splice and/or other discontinuity, and around a second coiling element and back either through the storage device means when the respective cable length has a seismic station and/or coupler/splice and/or other discontinuity or through the free space or room when the respective cable length does not have a seismic station and/or coupler/splice and/or other discontinuity, and further around the first coiling element.

13. The method for loading and/or unloading according to claim 12, wherein the cable is a lead-in cable comprising branch cables and Y-couplers, and wherein the branch cables from the other end of the couplers are being wound or spooled around a third coiling element, said third coiling element having one end attached to a bottom side of the container.

14. The method for loading and/or unloading according to claim 12, wherein under loading the method further comprises the step of spooling or winding the seismic cable around said coiling elements and running in between through said storage device or said space with a twist of approximately 360 degrees for one closed round or loop or turn.

15. The method for loading and/or unloading according to claim 12, wherein the spooling or winding steps are repeated until the cable is completely loaded or unloaded.

16. A method of storing a seismic cable, comprising the steps of:

providing a seismic cable array which comprises a number of seismic stations and/or couplers/splices and/or other discontinuities; and arranging said array in a container system, wherein the system comprises a container, said container being a standard 20' or 40' ISO container having an open top side or a detachable topside wall, and at least two coiling elements each having one end attached to a bottom side of the container and being adapted for spooling or coiling of the seismic cable array around them and storage device being adapted for allocating or accommodating, in an ordered arrangement, at least one of: a number of seismic stations, a number of couplers/splices and a number of other discontinuities which are being interconnected by sections of the seismic cable; wherein said storage device is being arranged between said at least two coiling elements and attached to the bottom side of the container.

* * * * *